United States Patent
Hankinson et al.

(10) Patent No.: US 8,485,470 B2
(45) Date of Patent: Jul. 16, 2013

(54) MOVABLE SEAT

(75) Inventors: Christopher Hankinson, Kingsley (GB); Benedict Nicholas Samuels, Tetbury (GB)

(73) Assignee: Zodiac Seats UK Limited (GB)

( * ) Notice: Subject to any disclaimer, the term of this patent is extended or adjusted under 35 U.S.C. 154(b) by 0 days.

(21) Appl. No.: 12/594,591

(22) PCT Filed: Mar. 2, 2008

(86) PCT No.: PCT/GB2008/001162
§ 371 (c)(1),
(2), (4) Date: Aug. 19, 2010

(87) PCT Pub. No.: WO2008/122762
PCT Pub. Date: Oct. 16, 2008

(65) Prior Publication Data
US 2010/0301162 A1 Dec. 2, 2010

(30) Foreign Application Priority Data
Apr. 5, 2007 (GB) .................................. 0706776.2

(51) Int. Cl.
*B64D 11/00* (2006.01)
(52) U.S. Cl.
USPC ....................................... 244/118.6; 248/429

(58) Field of Classification Search
USPC .. 297/143, 344.11, 311; 296/14, 156; 108/48, 108/143; 248/424, 429
See application file for complete search history.

(56) References Cited

U.S. PATENT DOCUMENTS

| | | | | |
|---|---|---|---|---|
| 3,370,813 | A * | 2/1968 | Albertine et al. | 244/118.5 |
| 5,947,416 | A * | 9/1999 | Kraft | 244/118.5 |
| 7,032,523 | B2 * | 4/2006 | Forslund et al. | 108/50.01 |
| 7,181,988 | B2 * | 2/2007 | Nagai et al. | 74/89.22 |
| 7,533,861 | B2 * | 5/2009 | Trendelkamp | 248/429 |

FOREIGN PATENT DOCUMENTS

| | | |
|---|---|---|
| EP | 0227251 | 7/1987 |
| EP | 1116654 | 7/2001 |
| GB | 2152180 | 7/1985 |
| WO | WO2007009135 | 1/2007 |

* cited by examiner

*Primary Examiner* — Timothy D Collins
*Assistant Examiner* — Brian M O'Hara
(74) *Attorney, Agent, or Firm* — Dean W. Russell; Kristin M. Crall; Kilpatrick Townsend & Stockton LLP

(57) ABSTRACT

There is provided an aircraft seat cubicle that has a seat convertible to a bed, a foot rest or ottoman, a table and a light, each movable lengthways of the cubicle. One of the items of furniture is received on a track. The item of furniture can be driven towards or away from the seat via a pulley, a cable, and a drive motor. A tension spring in the run of the cable stretches and releases its tension in order to allow the cable to slip on a capstan at one end of the track for driven movement of the furniture.

7 Claims, 4 Drawing Sheets

MOVABLE SEAT

The present invention relates to movable furniture for an aircraft convertible seat cubicle.

The object of the present invention is to provide improved movable furniture for an aircraft convertible seat cubicle.

According to the invention there is provided movable furniture for an aircraft convertible seat cubicle comprising:
- an item of furniture movable lengthways of the cubicle;
- a lengthways track at one side of the cubicle for the furniture;
- a runner attached to the furniture and received on the track;
- a capstan at one end of the track for driven movement of the item of furniture;
- a pulley at the other end of the track; and
- a cable passing around both the capstan and the pulley and attached at its ends to the runner and/or the item of furniture for moving the latter by means of the capstan.

In the preferred embodiment, the line has a spring in its extent towards the seat, whereby pushing of the furniture away from the seat tends to extend the spring and release tension in the line, allowing the line to slip on the capstan.

Where the item of furniture is of a size to extend at least substantially across the width of the cubicle, it preferably has a wheel for rolling on the floor opposite from the track and sharing the weight of the furniture with the track. Such item can be can be a table or an ottoman/foot rest.

Where the item of furniture is provided at or towards the track side of the cubicle, the track in co-operation with the runner preferably provides restraint against rotation of the item about an axis parallel with the track. Such an item can be a lamp.

To help understanding of the invention, a specific embodiment thereof will now be described by way of example and with reference to the accompanying drawings, in which.

Figure 1:
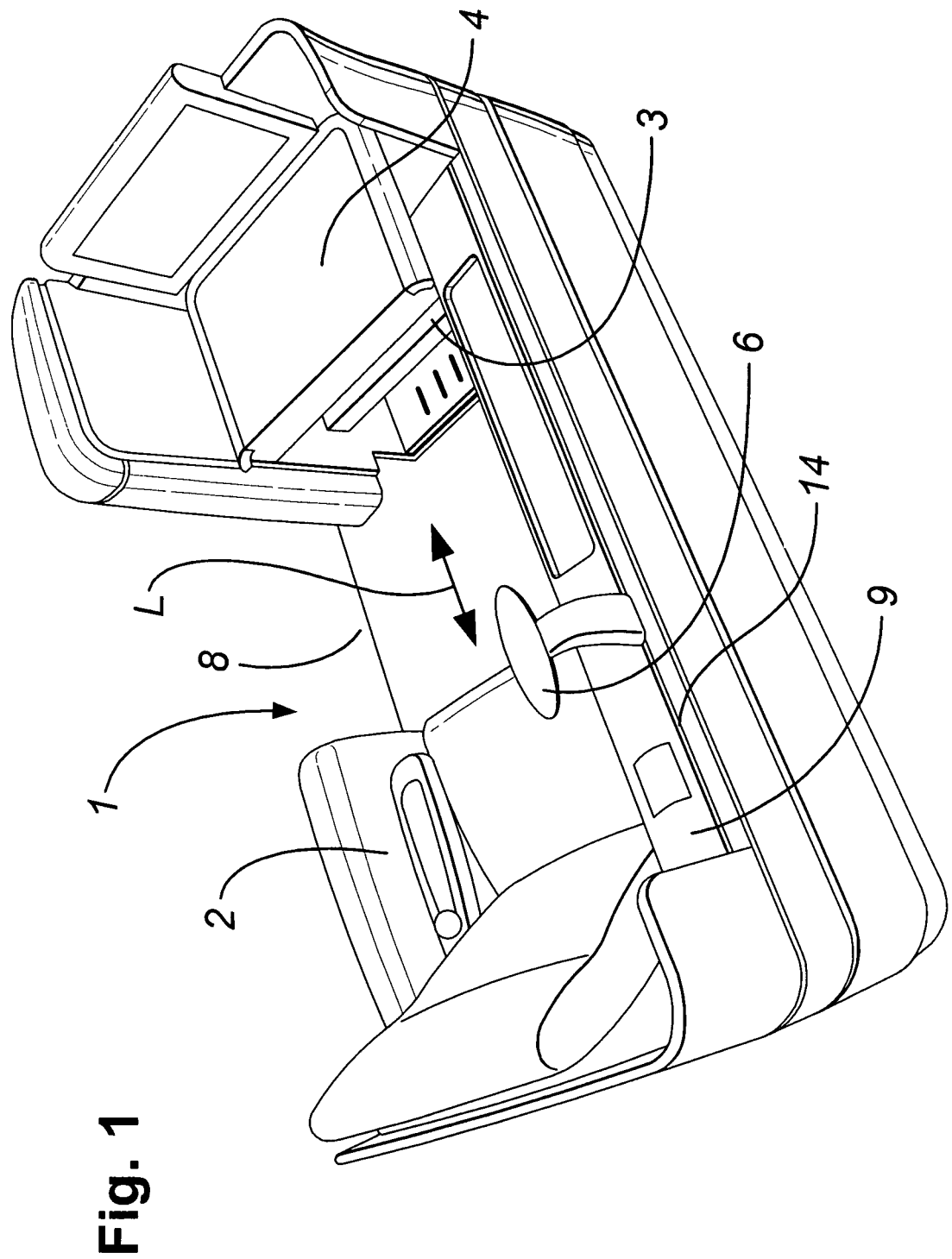
FIG. 1 is a perspective view from one side of an aircraft convertible seat cubicle having furniture movable in accordance with the invention.
Figure 2:
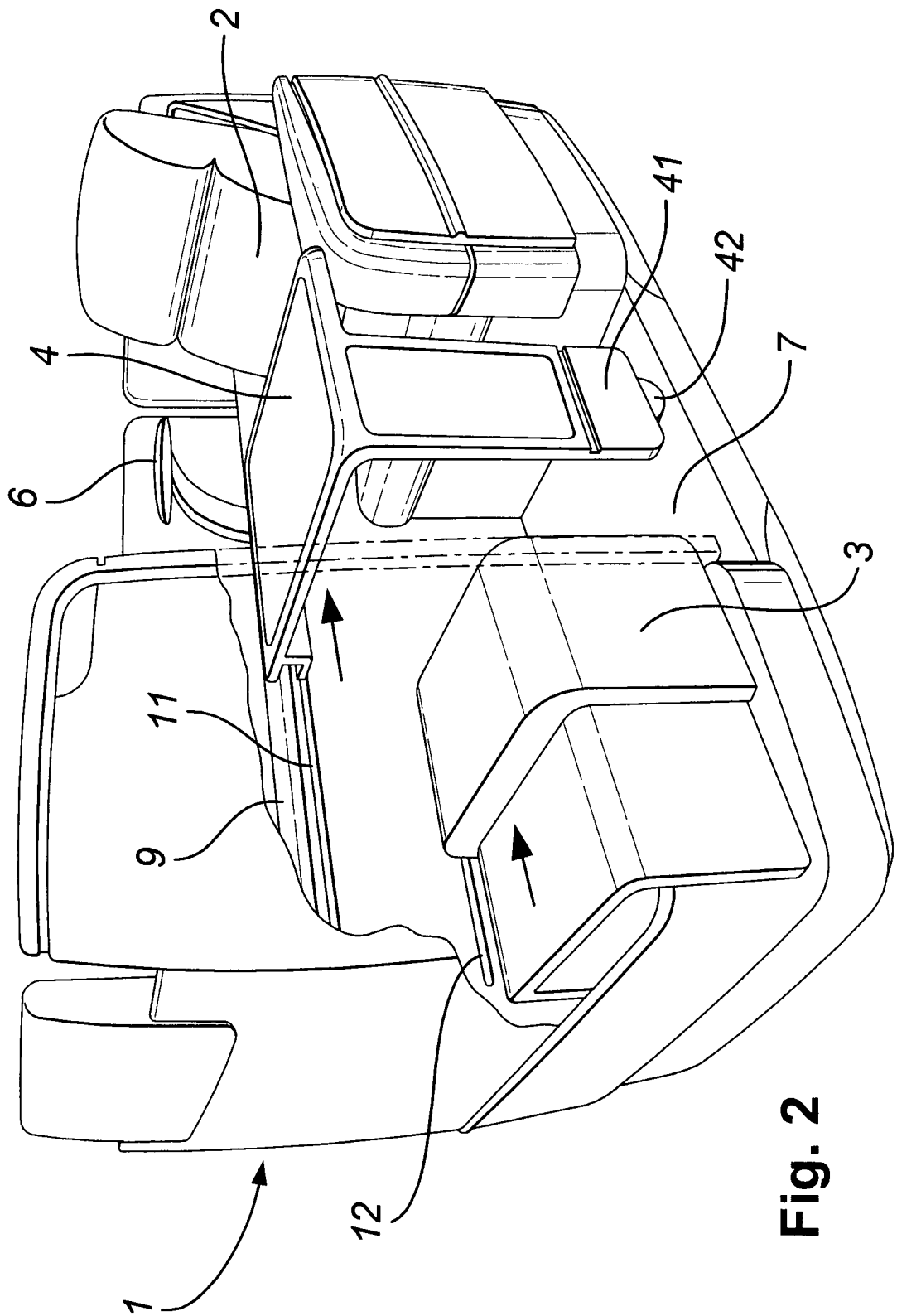
FIG. 2 is a similar view from the other side.
Figure 3:
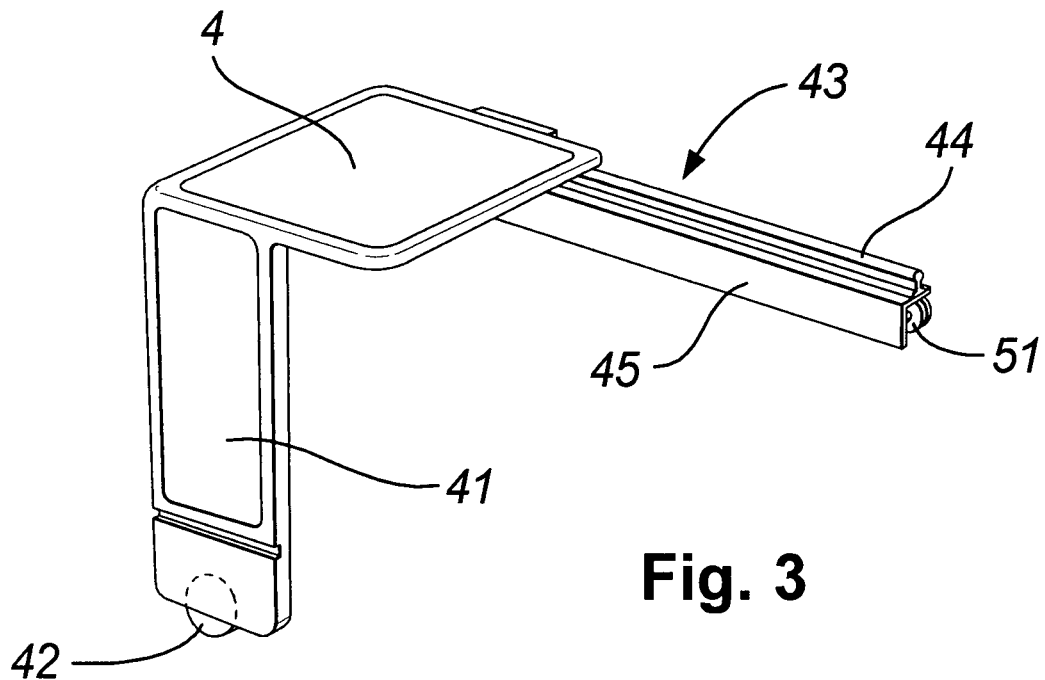
FIG. 3 is a perspective view of a movable table for the seat of FIG. 1, together with its support track.
Figure 4:
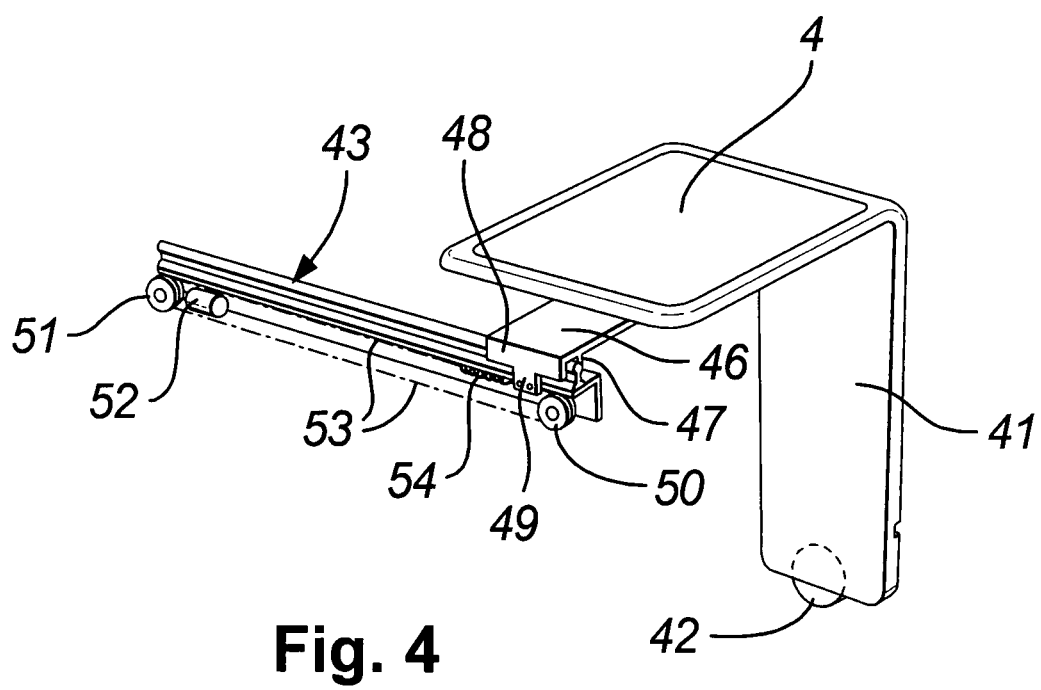
FIG. 4 is a similar perspective view of the table from another direction.
Figure 5:
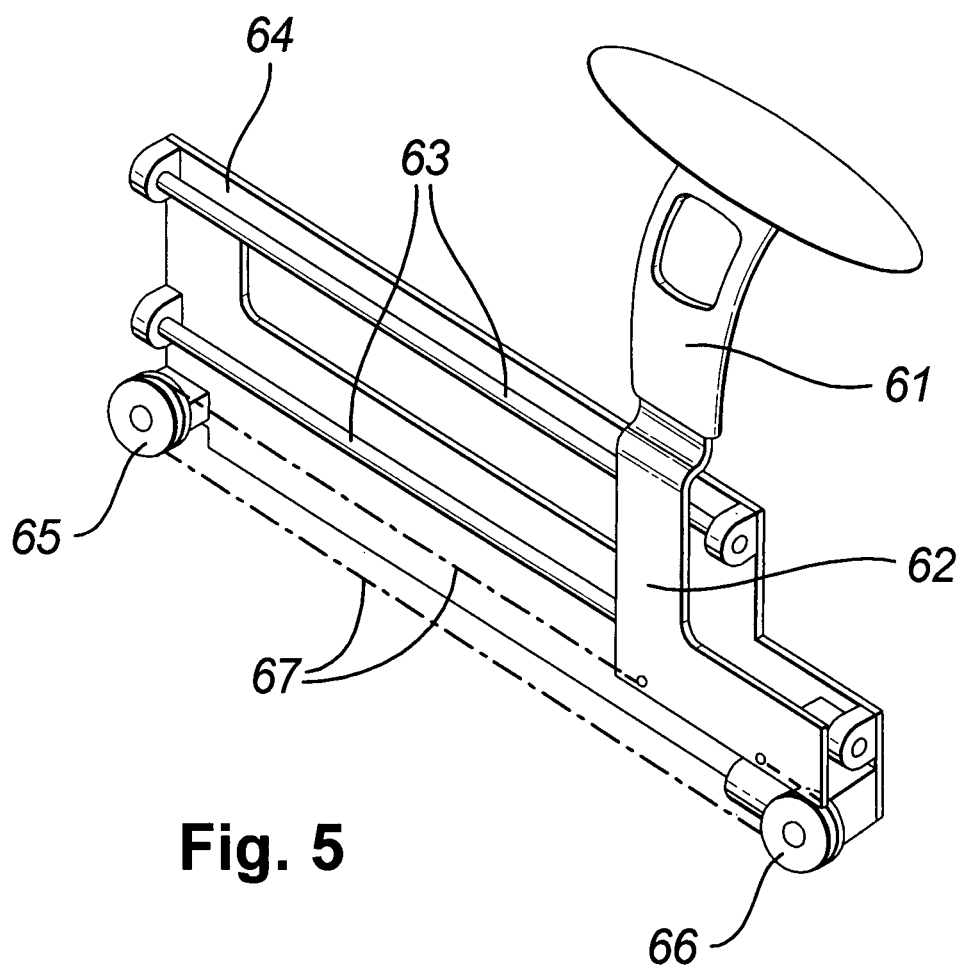
FIG. 5 is a similar perspective view of a light and its support track.

Referring to the drawings, a cubicle 1 has a seat 2 convertible to a bed. The seat has a mechanism, which is the subject of another application filed on the same day as this application under Nigel Brooks reference 2769.

The cubicle also has a foot rest or ottoman 3, a table 4 and a light 6, each movable lengthways L of the cubicle.

The mechanism for moving the table will be described first. The table has a leg 41, with a wheel 42 for support of one side of the table off the floor 7 of the cubicle on an access side 8 thereof. On the other side, the cubicle has a shelf 9 with a track 43 for support of this side of the table set inside a side panel 10 at a slot 11.

The track has a rail 44 mounted on a support angle 45. The table has a tongue 46, which extends into the slot to the track, with a bearing extrusion 47 of low friction material engaged on the rail. The extrusion is of a length to guide the table without risk of jamming. It has a drive connection flange 48 fixed on its side away the slot. The flange has a depending lug 49.

At the end of the support angle remote from the seat, a free running pulley 50 is provided with its top in line with the lug. The pulley has a revolution counter (not shown) for transducing to a controller (also not shown) the position of the table. At the opposite end of the support angle, a further pulley 51 is provided with a reduction drive motor capstain 52. The motor is connected to the controller and is operated by a user via a control panel 11. A drive cable 53 passes around the two pulleys and is attached to the lug 49.

The table can be driven towards or away from the seat. When the motor is stopped, the reduction gearing associated with the motor keeps the table in position. However, a tension spring 54 is connected in line with the cable at the lug 49, between the lug and the motor pulley 51. This arrangement is such that pushing of the table away from the seat stretches the spring, with concomitant relaxing of the tension in the run of the cable to the other pulley 50 and back to the return side of the pulley 51. This relaxation releases the capstan effect on the cable, with the result that the cable can slip on the pulley. Thus the table can be pushed away from the seat.

On the other hand, the table cannot be pulled towards the seat and must be driven under control of the panel 11. This one way action is likely to be convenient to a passenger in that quick and easy pushing of the table away for a visit to the lavatory or when preparing to sleep will be appreciated, whereas driving the table back for eating or working is unlikely to be thought an a disadvantage. Further in an emergency, the table will free run away from the passenger but will not free run back towards the passenger.

The ottoman has an exactly analogous arrangement at a further panel slot 12. This will not be described in repetitive detail.

The light 60 has a similar arrangement, but with differences. At a slot 14 in the shelf 9, a leg 61 of the light extends up from a carrier 62 bearingly mounted on a pair of rods 63 mounted beneath the slot on a sub-frame 64. This has a front, free-running pulley 65 and a motor driven rear pulley 66. A cable 67 passes from the carrier, around one pulley, to the other and back to the carrier. A spring can be provided in the run of the cable to either pulley allowing the light to be pushed freely in the direction extending the spring. However, it will generally be adequate to allow the light to be driven in either direction of the slot 14 by its motor under control from the panel 11.

The invention claimed is:

1. A movable furniture assembly for use as part of an aircraft cubicle, the cubicle having a convertible seat, the assembly comprising:
    - an item of furniture movable lengthways of the cubicle;
    - a lengthways track at one side of the cubicle for the furniture;
    - a portion of the item of furniture received on the track;
    - a capstan at one end of the track for driven movement of the item of furniture;
    - a pulley at the other end of the track; and
    - a cable passing around both the capstan and the pulley and connected to the item of furniture for moving the item of furniture via the capstan, and
    - a tension spring in the run of the cable, extending along the length of the cable and forming part of the cable, whereby pushing of the item of furniture away from the seat tends to stretch the spring and release tension in the cable, allowing the cable to slip on the capstan for movement of the item of furniture.

2. Movable furniture assembly as claimed in claim 1, wherein the item of furniture is of a size to extend at least substantially across the width of the cubicle and it has a wheel for rolling on a floor of the cubicle opposite from the track and sharing the weight of the furniture with the track.

3. Movable furniture assembly as claimed in claim 2, wherein the item of furniture is a table.

4. Movable furniture assembly as claimed in claim 1, wherein the item of furniture is an ottoman/foot rest.

5. The movable furniture assembly of claim 1, wherein the item of furniture comprises a runner, which is the portion of the item of furniture that is received on the track, wherein the cable is connected to the runner.

6. Movable furniture assembly as claimed in claim 5, wherein the item of furniture is provided at or towards a side of the cubicle where the track is, the track in co-operation with the runner providing restraint against rotation of the item of furniture about an axis parallel with the track.

7. Movable furniture assembly as claimed in claim 6, wherein the item of furniture is a lamp.

* * * * *